Patented May 9, 1939

2,157,697

UNITED STATES PATENT OFFICE 2,157,697

MANUFACTURE OF PLASTIC MASSES

Max Hagedorn, Dessau, Germany, assignor to I. G. Farbenindustrie Aktiengesellschaft, Frankfort-on-the-Main, Germany No Drawing. Application May 23, 1936, Serial No. 81,505. In Germany May 25, 1935

8 Claims. (Cl. 260—36)

My present invention relates to the manufacture of plastic masses and more particularly to the manufacture of plastic masses from polyvinylchloride.

For many purposes polymerized vinylchloride in a pure form is not suitable because it is very brittle at low temperatures. The known softening agents which like camphor are very effective in materials made of nitro cellulose fail in the case of polyvinylchlorides, even though they may have a solvent action thereon.

This invention is based on the observation that among the agents which serve for softening plastic masses the esters formed from aromatic carboxylic acids and aliphatic alcohols having a straight carbon chain of more than 8 carbon atoms have a surprisingly favorable effect on polymerized vinylchlorides and mixtures containing them, in that such esters increase the extensibility of the products and raise the resistance to creasing and in particular prevent brittleness of the material at a low temperature. The threads, sheets and moulded or cast products made from polyvinylchlorides and mixtures containing them with the aid of the softening agents herein prescribed have a high stability to cold, even to temperatures below the freezing point.

As ester components are suitable all long-chain aliphatic alcohols from octyl alcohols onwards, particularly decyl-, dodecyl- and tetradecyl-alcohol. Also mixtures of these homologous alcohols, obtainable, for example, by reducing the acids of cocoanut or palmkernel oils, are particularly applicable for making the esters of aromatic acids. Unsaturated alcohols such as undecylenic alcohol and oleyl alcohol and saturated polyhydric alcohols, like glycols having 12 carbon atoms, or alcohols which are produced by attaching OH groups to the double linking of oleyl alcohol are also suitable, as well as polmityl alcohol and stearyl alcohol. As acid components of these esters, benzoic acid must be named as the most important, but derivatives of benzoic acid such as chloro- and methoxy-benzoic acids or homologues of benzoic acid, such as phenyl acetic acid, nuclear homologues such as naphthalene carboxylic acid, anthracene carboxylic acid and resinous acids such as abietinic acid, furthermore acids of hydrogenized ring systems, hexahydrobenzoic acid and the technically important naphthenic acids, or unsaturated acids such as cinnamic acid, or polycarboxylic acids such as phthalic acid, may be used.

Plastic masses within the ambit of this invention are those which are products of the direct polymerization of vinyl-chlorides as well as the forms obtained by after-chlorination as described in U. S. Patent 1,982,765; furthermore mixed polymerizates made from various vinyl compounds or products made by mixing polyvinylchlorides with other polymerization compounds. The plastic materials may be used for making threads, films, sheets and moulded products of all kinds, particularly for the photographic industry and the electrical industry. The plastic masses are worked up by the usual processes, namely by casting solutions thereof, by shaping them according to the Celluloid processes, by moulding, rolling and blowing or spraying with or without the addition of solvents or diluents. The shaped masses exhibit complete homogeneity and highly elastic properties even at low temperatures.

The following examples illustrate the invention, the parts being by weight:

*Example 1.*—100 parts of polyvinylchloride containing 64 to 65 per cent of chlorine as described in U. S. Patent 1,982,765 are dissolved in 400 parts of methylenechloride and there are added to the solution 20 parts of the benzoic acid ester of the mixture of alcohols containing more than 8 carbon atoms obtained by reducing the acids of cocoanut oil. The solution is worked up in the ordinary manner to produce sheets of 0.15 mm. thickness; these sheets have an extensibility of about 120 to 150 per cent, whereas the corresponding films free from the addition have only 5 to 7 per cent extension. Exposed for 10 minutes at −18° C. the sheets can be folded twenty times, whereas the pure polyvinylchloride has under these conditions a folding number=0.

*Example 2.*—The mixture of polyvinylchloride described in Example 1 and oleylbenzoic acid ester in the proportion 3:1 made by kneading the constituents together with an addition of ether is dried and moulded at a pressure of 200 atmospheres at 110° C. into a transparent plate of 1 mm. thickness which is not brittle at −20° C. A similar plate made without the addition of the oleylbenzoate breaks at this temperature when an attempt is made to bend it.

*Example 3.*—The mixed polymerizate from 78 parts of vinylchloride and 22 parts of acrylic acid methylester is moulded in the press with addition of 30 per cent octodecylphenylacetate. Plates thus made of a thickness of 0.5 mm. have a folding number of 6 to 8 at −20° C. Similar plates made without the addition of the softening agent have under these conditions a folding number =0.

Example 4.—A physical mixture of 3 parts of polyvinylchloride and 1 part of polyacrylic acid nitrile is mixed intimately with 25 per cent of the para-methoxybenzoic acid ester of dodecylglycol by means of a calender. The skin thus produced may be formed into transparent plates by pressure between highly polished sheets of metal; the plates have a very high stability to cold similar to that of the product of Example 3.

Example 5.—50 parts of the mixed polymerizate from 80 per cent of vinylchloride and 20 per cent of vinylacetate are dissolved in 150 parts of acetone and after the addition of 10 parts of decyl-phthalate the solution is cast to form a film of 0.2 mm. thickness. The film has an extension of 50 per cent and at −15° C. a folding number =30. The corresponding values for the mixed polymerizate film without the softening agent are 20 per cent extension and folding number =2 at −15° C.

What I claim is:

1. A process of plasticizing polyvinylchloride containing 64 to 65 per cent of chlorine which comprises incorporating therein the ester of benzoic acid with the alcohols containing a straight carbon chain of more than 8 carbon atoms from cocoanut oil acids.

2. A process of plasticizing a mixed polymerizate from vinyl chloride and acrylic acid methyl-ester which comprises incorporating therein octodecylphenylacetate.

3. A composition of matter comprising polyvinylchloride containing 64 to 65 per cent of chlorine and as a plasticizer the ester of benzoic acid with the alcohols containing a straight carbon chain of more than 8 carbon atoms from cocoanut oil acids.

4. A composition of matter comprising a mixed polymerizate from vinylchloride and acrylic acid methyl ester and octodecylphenylacetate.

5. A process of plasticizing polyvinyl-chloride containing 64 to 65 per cent of chlorine which comprises incorporating therein the ester of benzoic acid with oleyl alcohol.

6. A composition of matter comprising polyvinylchloride containing 64 to 65 per cent of chlorine and as a plasticizer the ester of benzoic acid with oleyl alcohol.

7. A process of plasticizing polyvinyl chloride and masses containing a preponderating amount of polyvinyl chloride which comprises incorporating therein an ester of an aliphatic alcohol selected from the group consisting of decyl-alcohol, dodecyl-alcohol, tetradecyl-alcohol, octodecyl-alcohol, the alcohols from cocoanut oil acids, the alcohols from palm kernel oil acids, undecylenic alcohol, oleyl alcohol, the alcohols obtained by attaching OH groups to the double linkage of oleyl alcohol, a glycol having 12 carbon atoms, palmityl alcohol and stearyl alcohol with an acid selected from the group consisting of benzoic, chlorobenzoic, methoxybenzoic, phenylacetic, naphthalene carboxylic, anthracene carboxylic, abietinic, hexahydrobenzoic, naphthenic, cinnamic and phthalic acids.

8. A composition of matter comprising polyvinyl chloride and masses containing a preponderating amount of polyvinyl chloride and as a plasticizer an ester of an aliphatic alcohol selected from the group consisting of decyl-alcohol, dodecyl-alcohol, tetradecyl-alcohol, octodecyl-alcohol, the alcohols from cocoanut oil acids, the alcohols from palm kernel oil acids, undecylenic alcohol, oleyl alcohol, the alcohols obtained by attaching OH groups to the double linkage of oleyl alcohol, a glycol having 12 carbon atoms, palmityl alcohol and stearyl alcohol with an acid selected from the group consisting of benzoic, chlorobenzoic, methoxybenzoic, phenylacetic, naphthalene carboxylic, anthracene carboxylic, abietinic, hexahydrobenzoic, naphthenic, cinnamic and phthalic acids.

MAX HAGEDORN.